No. 635,575. Patented Oct. 24, 1899.
E. McHUGH.
VEHICLE HUB.
(Application filed Feb. 16, 1899.)
(No Model.)

WITNESSES:
Edw. Thorpe

INVENTOR
Elmer McHugh.
BY
ATTORNEYS.

THE NORRIS PETERS CO., PHOTO-LITHO., WASHINGTON, D. C.

UNITED STATES PATENT OFFICE.

ELMER McHUGH, OF LAMBERTVILLE, NEW JERSEY.

VEHICLE-HUB.

SPECIFICATION forming part of Letters Patent No. 635,575, dated October 24, 1899.

Application filed February 16, 1899. Serial No. 705,649. (No model.)

*To all whom it may concern:*

Be it known that I, ELMER MCHUGH, of Lambertville, in the county of Hunterdon and State of New Jersey, have invented a new and useful Improvement in Vehicle-Hubs, of which the following is a full, clear, and exact description.

The object of my invention is to provide a means whereby an elastic cushion may be made to form a portion of the hub or constitute a yielding bearing for the axle or a yielding connection between the inner surface of the hub and the axle.

A further object of the invention is to accomplish the results above mentioned in a simple, durable, and economic manner and yet enable a hub having the improvement applied to be readily removed from the axle.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
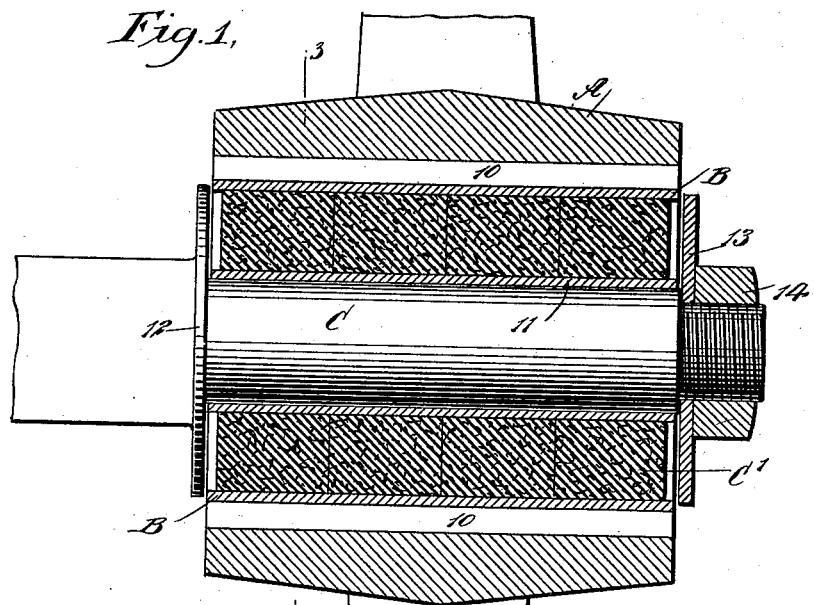
Figure 2:
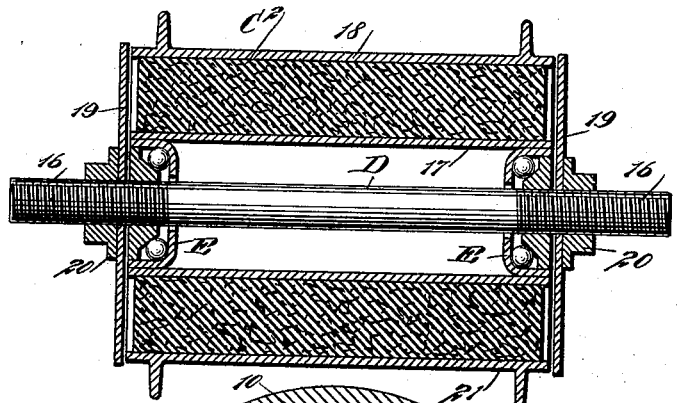
Figure 3:
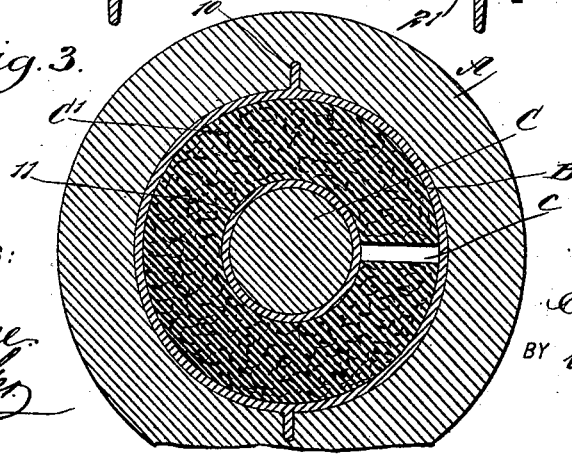

Figure 1 is a longitudinal section through a vehicle-hub, illustrating the application of the improvement thereto. Fig. 2 is a longitudinal section through the hub of a bicycle-wheel having the improvement applied thereto, the axle of the wheel being in side elevation; and Fig. 3 is a transverse section on the line 3 3 of Fig. 1.

A represents the hub of a vehicle, and B a sleeve for the interior of the hub, the said sleeve being preferably attached to the hub by means of keys 10. An inner sleeve 11 is likewise provided for the hub, the sleeve 11 being adapted to fit over the spindle C of the axle, and the inner sleeve 11 is prevented from moving laterally by forming a collar 12 on the axle where it connects with the spindle and locating upon the threaded outer end of the spindle a washer 13, held in position by a nut 14.

The space between the inner and outer sleeves B and 11 is practically filled by a cushion C'. This cushion is made of an elastic material—rubber, for example—and while it may be made in one piece it may be made in sections, if desired. The cushion C is not continuous, since a space is provided between its ends to admit of the expansion and contraction of the cushion under conditions of wear, and for the same reason the outer ends of the cushion do not extend to the flange 12 of the axle and the washer 13, as shown in Fig. 1. Under such an arrangement the cushion is capable of expanding endwise as well as circumferentially. To facilitate this action, the walls of the sleeves 17 18, which walls engage the cushion, are made smooth, as shown in the drawings.

In Fig. 2 I have illustrated the application of the improvement to the crank-hanger of a bicycle, in which D represents the crank-shaft, the said crank-shaft having a threaded surface 16 at each of its ends. The crank-shaft D is held to turn in ball or roller bearings E, and a sleeve 17 is made to surround the cone-casings of the roller or ball bearings, and in connection with the sleeve 17, which may be termed the "inner" sleeve, corresponding to the sleeve 11, (shown in Fig. 1,) an outer or hub sleeve 18 is employed, corresponding to the sleeve B, as illustrated in Fig. 3. Washers 19 are made to engage with the outer face of the cones of the roller or ball bearings E, the said washers being loosely fitted upon the shaft D, and the washers are held in position by nuts 20, that are secured upon the threaded portions of the shaft.

The cushion $C^2$, corresponding to the cushion C', (shown in Fig. 1,) practically fills the space between the inner and outer sleeves 17 and 18. The cushion may be in one piece, as illustrated in Fig. 2, or, as heretofore stated, may be in sections, as shown by the dotted lines in Fig. 1; and I desire it further to be understood that although the washers at the ends of the hubs or bearings are shown as extending up to the outer sleeves of said hubs or bearings the washers may be reduced in diameter and the outer sleeves may be projected beyond the peripheral surfaces of the washers or equivalents employed.

It is evident that a cushion employed as above set forth will relieve the wheels of vehicles of any construction from the jar incident to the usual mountings of the wheels and that the cushions may be solid or pneumatic.

Having thus described my invention, I claim as new and desire to secure by Letters Patent—

A vehicle-hub, comprising an inner sleeve adapted to surround the axle and having a smooth wall, an annular cushion surrounding the inner sleeve and engaging said wall and having its edges separated to form a space permitting the expansion and contraction of the cushion, an outer sleeve having a smooth wall inclosing the cushion and lying snugly against the same, and means carried by the axle at each end of the hub and respectively bearing against the ends of the hub to cover the cushion.

ELMER McHUGH.

Witnesses:
 LENA MAURER,
 MRS. A. ETTINGER.